Figure 1:
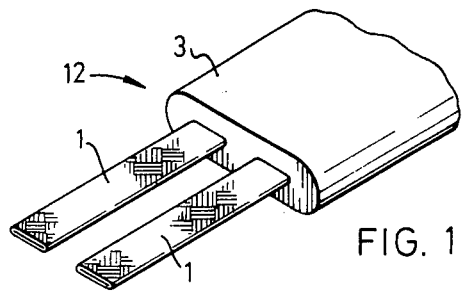

United States Patent [19]
Cooper

[11] Patent Number: 4,575,617
[45] Date of Patent: Mar. 11, 1986

[54] HEAT TRACING TAPE AND POWER CONTROL SYSTEM

[75] Inventor: Peter J. Cooper, Southport, England

[73] Assignee: Cooperheat, England

[21] Appl. No.: 599,447

[22] Filed: Apr. 12, 1984

[51] Int. Cl.[4] .............................................. H05B 1/01
[52] U.S. Cl. .................................... 219/494; 219/510; 219/528; 219/535; 219/549; 338/208; 338/212; 338/214
[58] Field of Search .............. 219/211, 212, 345, 528, 219/529, 541, 545, 549, 552, 553, 490, 492, 494, 510; 338/208, 209, 210, 212, 214, 295

[56] References Cited

U.S. PATENT DOCUMENTS

| | | | |
|---|---|---|---|
| 787,047 | 4/1905 | Leonard | 338/208 X |
| 1,962,041 | 6/1934 | Spong | 338/208 X |
| 2,533,409 | 12/1950 | Tice | 338/295 X |
| 2,758,194 | 8/1954 | Heron | 219/528 X |
| 2,938,992 | 5/1960 | Crump | 219/528 |
| 2,982,932 | 5/1961 | Morey | 338/212 |
| 3,022,412 | 2/1962 | Waters | 219/549 |
| 3,041,441 | 6/1962 | Elbert et al. | 219/528 X |
| 3,088,019 | 4/1963 | Crump | 219/528 X |
| 3,265,864 | 8/1966 | Levinson | 219/545 |
| 3,344,385 | 9/1967 | Bartos et al. | 338/212 |
| 4,352,007 | 9/1982 | Baker et al. | 219/549 X |
| 4,419,569 | 12/1983 | Colten | 219/528 |

FOREIGN PATENT DOCUMENTS

| | | |
|---|---|---|
| 895109 | 1/1945 | France . |
| WO82/01112 | 4/1982 | PCT Int'l Appl. . |
| WO83/01138 | 3/1983 | PCT Int'l Appl. . |
| WO84/01684 | 4/1984 | PCT Int'l Appl. . |
| 229203 | 2/1925 | United Kingdom ............... 338/214 |
| 900516 | 7/1962 | United Kingdom . |
| 914973 | 1/1963 | United Kingdom . |
| 959972 | 6/1964 | United Kingdom . |
| 1353070 | 5/1974 | United Kingdom . |
| 1515127 | 6/1978 | United Kingdom . |

Primary Examiner—Volodymyr Y. Mayewsky
Attorney, Agent, or Firm—Brooks Haidt Haffner & Delahunty

[57] ABSTRACT

A heat tracing tape which can be cut to required lengths has a heating element comprising at least two lengths of woven or braided resistance wire each in the form of a flat strip. The strips are encased in extruded silicone rubber whereby they are spaced from one another. The strips are electrically connected at one end by a connector and the tape is provided with a power supply termination either at its other end, or at a T-branch connection, for connecting the tape to the power control system. The power control system is adjustable to set an estimated value of power required to maintain a predetermined process temperature. The system automatically adjusts the power supplied to the tape to the estimated value by means of a feedback control system. A process temperature sensor also regulates the power supplied to the tape in accordance with a sense temperature.

7 Claims, 11 Drawing Figures

HEAT TRACING TAPE AND POWER CONTROL SYSTEM

This invention relates to a heat tracing tape and power control system which is used, for example, to maintain pipework and/or storage vessels at a predetermined temperature. The invention may be used, for example, to maintain process temperature, or to prevent freezing of materials which are normally in a liquid state in pipework and/or storage vessels.

So-called "heat tracing tape" is applied to the external surfaces of pipework and/or storage vessels to provide a form of surface heating by means of the heat generated in an electrical resistance. The heat tracing tape which is currently available is of either the "series type", or the "parallel type".

Conventional heat tracing tape of the "series type" has a resistance determined by its length and the length of tape required for a particular use must be specified before it is manufactured and terminated in a factory. Clearly, the need to produce such tape in a factory leads to additional expense and delay. For example, a drawing showing a pipework layout must first be made and supplied to the factory and various lengths of tape must then be manufactured and supplied to the site where the different lengths of tape need to be sorted for use at the respective sections of the pipework. Problems can also arise where, for example, an intended length of tape is found not to fit the respective section of the pipework due to error or to the manner of installation. An extra length of tape would then be needed to fill any "gap" or a tape end which is too long may need to be wrapped around a vessel or pipe thereby leading to an undesirable "hot spot". Thus, one of the main disadvantages of the conventional tape of the "series type" is that it cannot be cut to length and directly used on site.

The above disadvantages are even more apparent with a series type of heat tracing tape having a heating element in the form of parallel strips of corrugated metal foil which are connected in series. The corrugated foil strips are located side by side between confronting layers of woven glass cloth and are secured in respective tubular recesses which are formed by parallel lines of stitches passing through the layers of glass cloth and adjacent the longitudinal edges of the foil strips. The glass cloth "envelope" is inserted into an insulating sheath made of silicone rubber and the ends of the heating element are connected to a power input termination. Whilst this form of tape has better heat transfer properties due to its relatively larger heat transfer surface area, it is neither easy, nor cheap to manufacture and it is also susceptible to breakage since flat tape is effectively adpated to flex or bend only transversely of its major surfaces.

Heat tracing tape of the "parallel type" solves some of the latter problems. In the parallel type, a pair of low resistance conductive parallel bus bars extend longitudinally of the tape, the bars being alternately connected at intervals by fine wire nickel-chromium alloy (Ni/Cr) heating elements. Parallel circuitry tape can be cut on site, because there are no series connected ends as in the case of the "series type", One form of the "parallel type" of heat tracing tape employs parallel bus bars each made from high conductive flat foil strips (e.g. which are copper plated). The heating elements are formed by a fine Ni/Cr wire which is woven into a tape made of glass fibres. The tape is unrolled along the length of the parallel foil bus bars and the Ni/Cr wire is riveted to alternate bus bars at spaced intervals, e.g. of 10 inches (25 centimeters) to form a zig-zag along the length of the tape. Such tape is known as "constant wattage" tape, since there is little change in its power output as the workpiece (to which the tape is attached) heats up. However, this "constant wattage" clearly imposes a limitation on the use of the parallel type of tape, since some installations may require different power inputs to others (e.g. with regard to the required watts/foot or watts/meter). Therefore, different forms of the parallel type of tape need to be manufactured and made available (e.g. on site) with regard to the different power ratings required for various applications. Moreover, there are problems of manufacture due to riveting the fine wire in a zig-zag pattern at spaced intervals and to poor electrical connections which can occur where the rivets join the heating wire to the foil bus-bars. Also, when the tape is cut to length on site, or where a section of the tape is open to form a branch, as in the case of a T-connection, end portions of the tape, or an intermediate portion of the tape may be starved of current and this leads to thermal dead zones.

Another form of "parallel circuitry" tape employs parallel copper bus wires between which is extruded a special conductive compound which acts as the heating element. This compound offers an increasing resistance to current as it heats up. Hence, more heat is produced at lower temperatures and less at higher temperatures. This form of tape avoids the riveting problems of "constant wattage" tape, and the need for fine Ni/Cr wires and its particular feature is that it does not normally allow a predetermined temperature to be exceeded, e.g. with a tape of given construction which produces a predetermined number of watts per meter, so an upper limit temperature controller is not essential. However, despite the latter feature, this form of tape suffers from a bus wire-to matrix contact problem, i.e. there can be poor electrical contact between the conductive compound and the bus wires, and this can lead to variations in the rated output of the tape. Moreover, the "self-limiting" feature of this form of tape is not always an advantage because, in some cases, a higher current flow may be required at least for short intervals at higher temperatures.

Apart from the above-mentioned problems which arise with known tapes, it is generally desirable to use a heat tracing tape which is easy to manufacture, which can be cut to length on site and joined or spliced using conventional crimp connectors and crimping tools, and which is robust. Tapes which employ flat foil, either as a heating element, or as conductive bus bars or bus wires, whether corrugated or not, are not suitable for use with conventional crimp connectors and crimping tools. This means that conductors in the tape need to be brought out into a termination box whenever a splice or T-connection has to be made. This is time-consuming and leads to further expense. Moreover, besides withstanding use of conventional crimps and crimping tools and providing good electrical connections, the heat tracing tape should be as flexible as possible in more than one place and robust enough to withstand bending, flexing and handling on site during installation, and stretching and contracting as the temperature rises and falls during use. It is also advantageous to avoid making electrical connections or splices which need to be brought out of the insulation surrounding, e.g. pipework, because such connections or splices are not capable of withstanding the temperatures under the insulation. It is also desirable to provide a tape which has the advantages of the "series type", since the current flow in the latter type of tape is the same at any point along its length and there are no problems (as with the "parallel type") of a loss of power along the length of the tape (e.g. due to bus bar resistance) which leads to cooler ends.

In seeking to provide an improved robust "series type" heat tracing tape, the problem also exits of providing adequate power control. For example, with an on-site installation, it is necessary to cope with different power ratings (watts/meter), different supply voltages and situations where mistakes are made in estimating the power consumed by the tape, e.g. where a short length of tape is inadvertently connected to a power supply which will deliver a high current. Moreover, the power control means must not only be capable of dealing with, e.g. a variety of power ratings under different conditions, but it must also be simple to operate so as to avoid making demands on the operator's time and ability for making adjustments to provide the required performance. Preferably, a power control means needs to be provided which can simply be connected to any length of series type tape and set to a required power output without any further problem.

The present invention seeks to solve the aforementioned problems by providing a heat tracing tape and a power control system, said heat tracing tape being in a form which can be cut to required lengths and having a series heating element in that the tape comprises at least two lengths of woven or braided resistance wire, each of said lengths being in the form of a flat strip, said flat strips being encased in extruded insulating material whereby they are spaced from one another along the length of the tape, said strips being electrically connectible together at one end of the tape by means of a connector so as to form the series heating element and the tape being provided with a termination for connection to a supply of current via said power control system; said power control system including adjustable power control means which can be adjusted to an estimated value for supplying a suitable amount of power to said tape in order to maintain a preset process temperature, said adjustment normally being made when the length of said tape lies within a predetermined range, a current sensor for sensing the current supplied to the tape and for providing a feedback signal to said power control means, said power control means being responsive to the feedback signal to adjust the power supplied to said tape to the estimated value, and a process temperature sensor connected to process temperature control means, said power control means being responsive to said process temperature control means to regulate the power supplied to said tape in accordance with the sensed temperature.

Amongst the advantages of the invention, the use of flat and woven or braided resistance wire enhances the flexibility and robustness of the heat tracing tape; the tape can be cut to length, terminated and/or spliced and connected with conventional crimp connectors and crimping tool on site; manufacture and installation are facilitated; and it is unnecessary to make extensive tests or to take any measurements in order to find a suitable adjustment of the power controller in order to attain the preset process temperature. In the latter respect, with a tape length in a given range, all that is required is to set the adjustable power control means to the estimated value of watts/ft or watts/meter because the power control means will automatically adjust the current supplied to the tape to the estimated value. It is most advantageous to cut series type tape to different lengths on site because piping systems often differ from the layouts shown on drawings and in may cases piping systems are run in the field without the use of drawings. It is also most advantageous to employ a power control system which is capable of automatically adjusting the power supplied to the tape to the estimated value, because the manufacturer need then only make one form of the series type tape, which can be used for various ratings over a range (e.g. 2.5-20 watts/foot or 8-66 watts/meter.) This avoids the distinct need to be made in various ratings and/or lengths to suit particular applications. Moreover, in a preferred embodiment of the invention, which employs a gate controlled device for supplying current to the tape, the power supplied to the tape can still be automatically adjusted to the estimated value even though the power control system is connected to a lower voltage supply than normal (e.g. to a 100 v supply instead of to a 240 v supply).

Further advantages of using a tape in which the heating element is made from woven or braided resistance wire and in which connections can be made under the insulation which normally surrounds the pipework and/or storage vessels to which the heat tracing tape is applied; the tape can be crossed over itself where the process temperature does not exceed a predetermined value (whereas it is normally considered to be unsafe to overwind conventional heat tracing tapes unless they are of the self-regulating type), and the tape can be cut and spliced anywhere along its length (e.g. to make a swift repair especially where valves are removed from pipework to which the tape is applied).

Preferably, the power control system employs a "soft-start" circuitry to eliminate any surge current when the tape is first supplied with power. In a preferred embodiment of the invention, the adjustable power control means comprises a gate controlled device (such as a triac) and a firing circuit connected to the gate of the device. The firing circuit may be controlled by a known technique (such as phase angle control) so as to cause the gate controlled device to regulate the amount of current supplied to the tape. An adjustable power control is used to set the estimated power and this provides a reference value which is compared by a comparator, with a feedback signal from the current sensor. The comparator generates an output to adjust the firing of the gate controlled device in that it increases the power supplied to the tape until the feedback signal matches the reference value. The "soft-start" circuitry delays the comparison of the reference value with the feedback signal (e.g. by means of a ramp control function) so that the power supplied to the tape is brought smoothly to the estimated value.

Preferably, the heating elements in the tape are made from wire which is woven or braided in a tubular form which is subsequently flattened.

Preferably, the insulating material which is extruded onto the woven or braided resistance wire is silicone rubber.

The tape is usually provided with a power supply termination at one end (i.e. opposite the end which is joined to form the series connection), the power supply leads being connected by means of crimped connectors to the respective strips of woven or braided resistance wire. However, it may be more convenient to make the power supply termination at a point intermediate the ends of the tape, i.e. by means of a T-branch connection. In the latter case, each end of the tape is connected by respective crimped connectors to form a series loop and one of the strips is cut intermediate this length to form the T-branch power supply termination. A similar T-branch connection may be made to form a spur or spurs along the length of the tape, i.e. to extend the series loop. Although this increases the total resistance of the tape, the power control system of the invention will automatically adjust the power supply to the tape to the estimated value (for a given tape length range). (The possibility of making T-branch connections was not available with conventional series-type heat tracing tape and there would have been a problem, with such conventional tape, of coping with the additional resistance of the spur or spurs.) The tape according to the invention can be easily cut and joined by crimped connectors to form T-branch connections.

Preferably, the power control system also includes alarm temperature control means connected to an alarm temperature sensor so as to provide an alarm in the event that the process temperature is approaching or has reached an upper limit.

Figure 9:
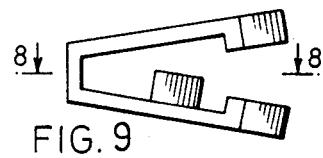
Figure 10:
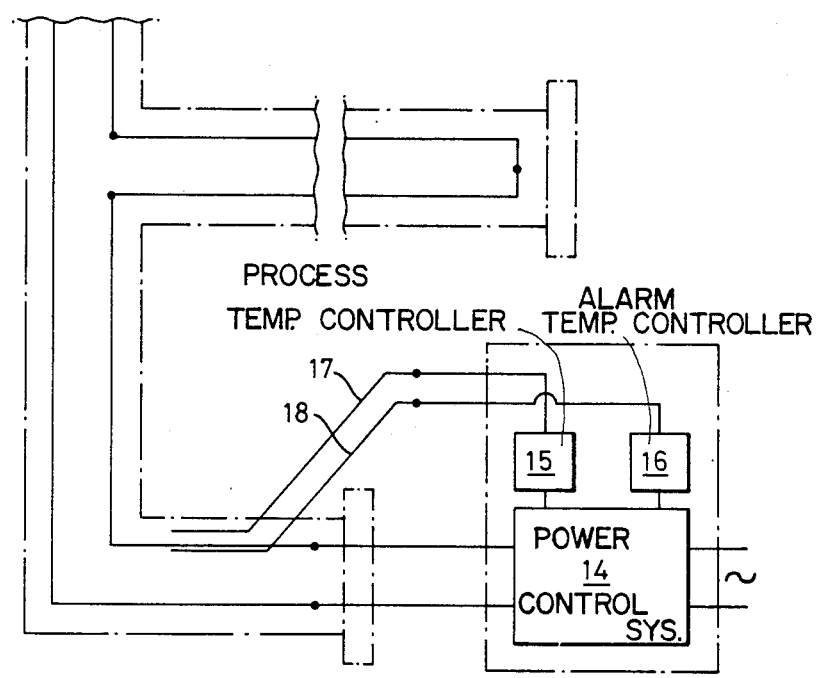
Figure 11:
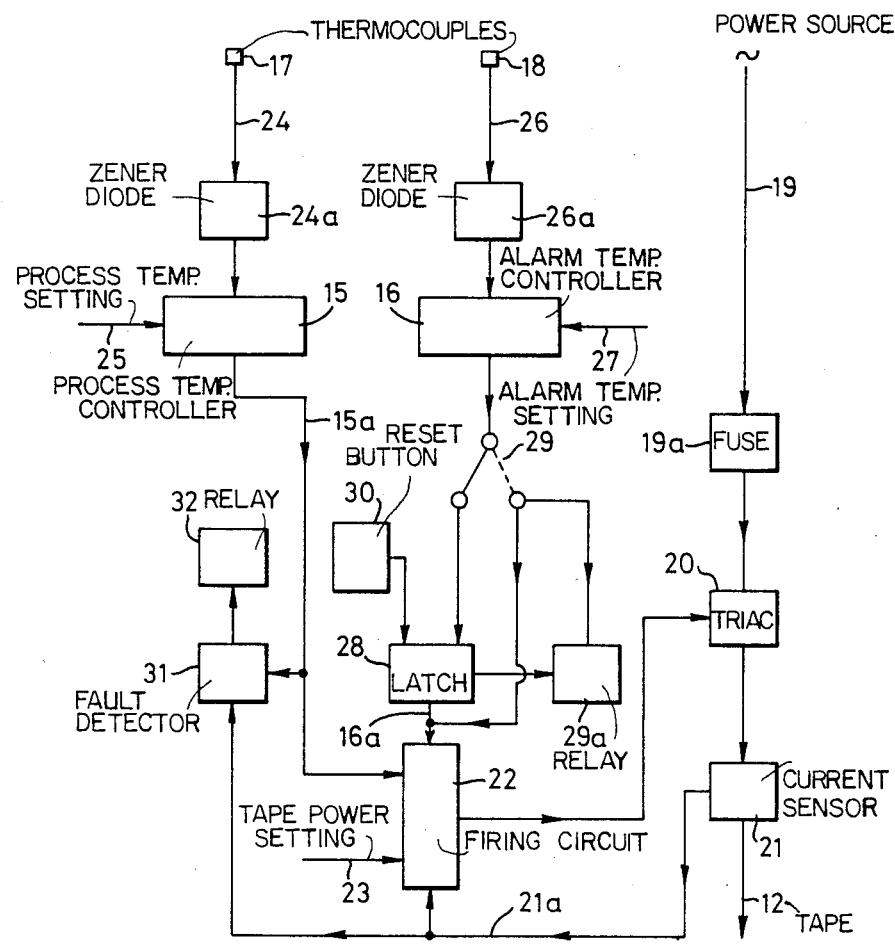

An example of the invention will now be described with reference to the accompanying schematic drawings, in which:

FIG. 1 is a perspective view, partly broken away, of a heat tracing tape in accordance with an embodiment of the invention, FIGS. 2-9 illustrate typical terminations and splices in the heat tracing tape according to FIG. 1, FIG. 10 illustrates a typical heat tracing tape installation, the tape being connected to a power control system, and FIG. 11 is a general block circuit diagram of one type of power control system.

Referring to FIG. 1, heat tracing tape 12 according to a preferred embodiment of the invention comprises a series heating element formed by parallel strips 1, each made of woven or braided resistance wire, such as nickel-chromium wire. In a particular example, the core was made by braiding 16 groups of 6 strands of nickel-chromium wire of a 37% nickel/18% chromium composition, each strand of wire having a diameter of 35 swg. Each strip 1 is made by braiding the Ni/Cr wire into a tubular form and by subsequently flattening the tube. The strips 1 are encased in extruded insulating material 3 whereby they are spaced from one another along the length of the tape (see FIGS. 2 and 3). The insulating material 3 is preferably silicone rubber having a hardness of about 80 on the Shore scale. The insulation may be extruded on to a spaced pair of flattened tubes of braided resistance wire, e.g. with the aid of a cross-heat extruding machine. Preferably, enough insulating material is maintained between the flattened tubes of braided resistance wire to enable the tape (produced by the extruding machine) to be slit longitudinally to provide respective lengths of individual insulated wire strips 1.

FIGS. 2-8 illustrate typical ways of making a series end connection and of terminating and splicing sections of a tape like that shown in FIG. 1.

Figure 2:
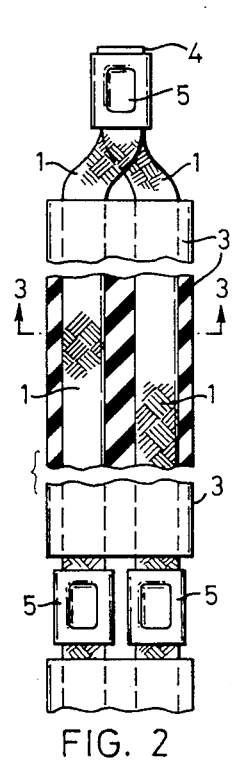
Figure 3:
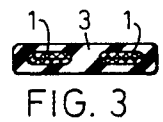

FIG. 2 illustrates a length of tape (shown in cross-section on line 3—3 in FIG. 3) having a series end connection 4 which is made by baring end portions of both of the strips 1, deforming the bared end portions laterally so that they overlap one another and then physically and electrically connecting the bared end portions together by means of a rectangular shaped metal ferrule which is crimped to secure the bared end portions together (crimped connector 5). The lower end of the tape is connected, by means of crimped connectors 5, to power supply leads so as to form a power supply termination. However, according to another arrangement, the strips 1 are connected together (by crimped connectors 5) at each respective end (e.g. of a longitudinal run) to form a series loop, and one of the strips is cut intermediate its ends and the cut ends are joined, by means of crimped connectors 5, to power supply leads to form a T-branch power supply termination (this is similar to the spur shown in FIG. 7—see below).

Figure 4:
Figure 5:
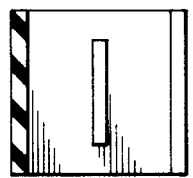
Figure 6:
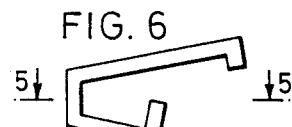

FIG. 4 is a longitudinal section of an end boot which is placed over the series end connection 4 of FIG. 1. FIG. 5 (which is a longitudinal section on line 5—5 of FIG. 6) and FIG. 6 (which is an elevation) illustrate a hinged splice cover which is located about the crimped connectors 5 at the lower end of the tape in FIG. 2.

Silicone rubber adhesive (not shown) is applied to both the end boot (FIG. 4) and the hinged cover (FIG. 6) to provide a waterproof seal.

Figure 7:
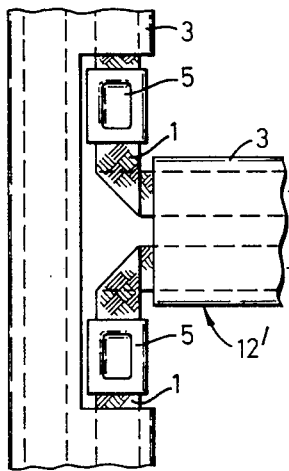
Figure 8:
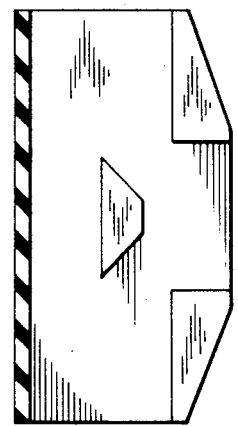

FIG. 7 illustrates how a T-connection is made to form a spur. A section of the insulation 3 is removed from one of the heating element strips 1, a section of the bared strip is severed and the bared free ends of strips 1 of another section of tape 12' are turned through 90° and connected, by crimped connectors 5, to the respective severed ends of strip 1 (similar to the technique shown in FIG. 2). The end (not shown) of the further section of tape 7 is joined by a crimp connector (as shown in FIG. 2) to complete the series loop. FIGS. 8 and 9 illustrate, in cross section and elevation respectively, a hinged cover which is used together with silicone rubber adhesive to provide a waterproof seal.

FIG. 10 is a block diagram of a typical installation in which the heat tracing tape 12 is attached to pipework shown by the broken line 13 and the tape is connected to a power control system 14. The power control system includes an adjustable process temperature controller 15 and an alarm temperature controller 16 which are connected to respective sensor or thermocouples 17, 18.

FIG. 11 shows the circuitry of power control system 14 in more detail. Power is supplied from line 19, via fuse 19a and triac 20, to the heat tracing tape 12 (only one line has been drawn to simplify the drawing).

A current sensor 21 is connected, via line 21a, as an input to a firing circuit 22 for the triac 20. The firing circuit 22 has an adjustable power setting 23 for adjusting the power delivered to the heat tracing tape 12 to an estimated value which lies in a range of from 2.5-20 watts/foot (8-66 watts/meter). (The maximum amount of power which the system is capable of delivering is limited by the supply voltage. Whilst the power supplied by a triac can be controlled from substantially 0-100%, the minimum power supplied by triac 20 is limited to provide, eg 2.5 watts/foot (8 watts/meter). A known phase angle control technique is used to control the power supplied by triac 20—see below.

Current sensor 21, which may be, for example, a resistor across which a voltage signal is developed, applies a feedback signal to the firing circuit 22 to cause the triac 20 to supply the estimated value of power to the tape 12. The firing circuit 22 may be, for example, an integrated circuit of the type TDA 2085A manufactured by Plessey and available as a phase angle motor control circuit. Such a circuit operates by means of a known phase angle control technique to regulate the amount of current supplied to the tape 12.

For example, the integrated circuit includes a comparator (not shown) having one input connected to the current sensor 21. The adjustable power setting 23 provides a reference value which is compared, by the comparator, with the feedback signal from the current sensor 21. As long as the signals differ, the comparator will generate an output to vary the phase angle of each half cycle of AC input power at which the triac 20 is Triggered. For example, when power is first supplied to the tape 12, the feedback signal is lower than the reference value and hence the phase angle at which the triac 20 is triggered will be moved in a direction to cause increasing power to be supplied to the tape 12. On the other hand, if the power supplied to the tape 12 overshoots the estimated value, the phase angle at which triac 21 will be triggered will be moved in the opposite direction so as to decrease the power supplied to the tape. The latter integrated circuit has a "soft-start" option where, for example, a capacitor (not shown) of a suitable value is connected in order to form part of a time-constant circuit for generating a ramp control function. This function enables the power supplied to the tape to be brought smoothly to the estimated value thereby avoiding any surge current on start-up and also any overshoot.

Fuse 19a will interrupt the current supplied to the tape 12 in the unlikely event of an excess current flow. Alternatively, some other form of known current interrupter may be employed which is either inherently sensitive to excess current, or to the signal derived from current sensor 21. Such excess current may be due to a short circuit.

In practice, a certain length of the heat tracing tape 12 is cut from a reel and is applied, e.g. to the pipework of a process plant. The end or ends of the tape are connected and a power supply termination is joined to the tape by means of the crimped connectors 5 to enable the power control system to be connected. The manufacturer of the system provides tabulated information which relates (a) the length of tape (meters), (b) the type of thickness of insulation applied to e.g. the pipework, (c) the process temperature required (°C.) in order to provide an estimated value of the power required (watts/meter). The tabulated information can be determined by the manufacturer either experimentally, or based on known formulae for conventional heat tracing tape (e.g. in accordance with U.S. or British Standards for heat tracing tape). The power setting 23 is then set to this estimated value (or something slightly higher) before the power supply is turned on. The firing circuit 22 then adjusts the actual power supply to the tape 12 to the estimated value. The heating continues until the required process temperature is reached as explained below.

The adjustable process temperature controller 15 is connected to the process temperature sensing thermocouple 17 via a zener barrier device such as zener diode 24a. The controller 15 includes a comparator for comparing the input, on line 24, via diode 24a, with a predetermined process temperature setting (indicated by arrow 25). The output of the comparator is supplied as an input, on line 15a, to firing circuit 22. When the temperature sensed by thermocouple 17 reaches the predetermined process temperature (set by control 25) the input (on line 15a) to the firing circuit 22 causes triac 20 to be switched off until the sensed temperature falls below the predetermined process temperature. In this way, the pipework and/or storage vessel which is heated by the tape 12 is maintained at the predetermined process temperature.

Alarm temperature controller 16 is similar to the process temperature controller 15. Controller 16 includes a comparator for comparing the input on line 26, from the alarm temperature sensing thermocouple 18 (which is supplied by a zener barrier diode 26a), with a predetermined alarm temperature setting (represented by arrow 27). The output of the comparator is supplied to alarm selector switch 29. If an "over-temperature" alarm is selected via switch 29 (as shown by the solid line), the output from controller 16 is supplied via a latch 28 as another input, on line 16a, to the firing circuit 22. Latch 28 is operated when the predetermined alarm temperature is exceeded and this maintains an "alarm temperature" input to the firing circuit 22 (and to alarm relay 29a) to cause the triac 20 to be switched off until the alarm temperature controller 16 responds to a temperature below a predetermined limit and the reset button 30 is pressed. If an under-temperature alarm is selected via switch 29 (as shown by the broken line), the output is supplied only to the alarm relay 29a which is energised when the sensed temperature from thermocouple 18 is less than the predetermined temperature setting input at 27.

Control of the triac 20 by means of the inputs 15a, 16a, 21a and 23 is achieved by known circuitry techniques and hence the particular construction of the individual components of the electronic circuitry and the way in which they work will be generally known to those skilled in the art and will require no further detailed description.

The current sensor 21 is also connected (via 21a) to a circuit fault detector 31. The output from process temperature controller 15 is also connected (via 15a) to the fault detector 31. The fault detector 31 detects either a loss of power to the system, or a fault in the tape 12 which causes no current to flow when the temperature controller 15 demands power. In either case, the circuit fault detector 31 activates the circuit fault relay 32. Both relay 32 and alarm relay 29a can be wired to give external signals of alarm conditions.

The tape can be manufactured in a standard rating of, for example, 20 W/ft (66 W/m) at 10 A which requires 2 V/ft (6.6 V/m), where W=watts, ft=foot, M=meter, A=amps and V=volts. Such tape is suitable for connection of any voltage up to 277 V (phase-to-neutral) e.g. 480 V, 3 phase, 50–60 herz supply. To calculate the maximum length of tape at the maximum rating of 20 W/ft, the voltage is divided by 2, the result being in ft (or with a maximum rating of 66 W/m, the voltage is divided by 6.6, the result being in meters).

EXAMPLE (a) With a tape length of from 60 to 120 ft (18.3–36.6 m), the adjustable power control setting 23 can be set to give an estimated value of power (for the process temperature involved) in a range of from 2.5–20 W/ft (8–66 W/m). Within this range, the power output of the triac 20 is controlled (effectively by adjusting the r.m.s. voltage of each cycle of AC from a minimum to a maximum value).

(b) If a longer length of tape is required than 120 ft (36.6 m), then the power output of the power control system will be reduced in inverse proportion to the square of the voltage. For example, with a 240 ft (73.2 m) length of tape, the maximum power obtainable is 5 W/ft (16 W/m).

(c) The tape is designed to allow a minimum of one seventh of the maximum power length to be connected. For example, with a power supply of 240 V, the maximum power length is 120 ft (36.6 m) and the minimum length of tape which can be connected is 18 ft (5.5 m).

Power connections from power control system to the heat tracing tape have a suitable rating to withstand, e.g. 200° C. (400° F.) maximum operating temperature of the process piping which is under thermal insulation. Since all power input and conductor connections of the tape can be made under the thermal insulation, the expense and disadvantage of bringing out the ends of the tape to a termination box whenever a splice, tee or end connection has to be made is avoided.

The use of woven and flattened resistance wire provides extra flexibility to the tape (despite the fact that the tape may handle e.g. 10 amps) and this flexibility is enhanced by the use of silicone rubber insulation. Moreover, the extended silicone rubber insulation is far easier to apply, hence saving manufacturers' costs. As there are only two heating elements in the tape of the preferred embodiment and not a plurality requiring stitching into glass cloth prior to adding a silicone rubber sheath, (as in the case of the known "series circuitry" tape) and as no glass cloth is used, it is easier for the heat to escape from the heating elements 1 through the silicone rubber insulation 3 and the elements 1 have a lower operating temperature for the designed rating. Even at the maximum design rating of 20 W/f (66 W/m), it is possible to overlap the tape, or use it as a convection-type heater strip placed sinusoidally under (say) valve bodies around which thermal insulation boxes have been built. Very even heating of valve bodies occurs when an oven-like structure is built around them. It is also much simpler to extract the valve from its heated box, for maintenance purposes, than to unwind heat tracing tape from around the body itself and under irregularly shaped and hand-applied cement-type insulation.

The heat tracing tape of the preferred embodiment is designed to operate from a 15A double-pole circuit breaker and, if metallic sheathing (braiding) is added over the tape, it may be desirable to add G.F.I. (ground fault interruption) to the circuit breaker to provide earth leakage protection, particularly for hazardous areas. The tape may also be supplied with an anti-corrosive outer jacket over the metallic braiding if the latter is likely to be attacked by corrosive conditions on the site.

The process control temperature of the preferred form of tape is controlled by means of a twisted pair thermocouple (17) or a thermostat bulb placed on the pipe itself by means of adhesive glass tape, the sensor tip being adjacent to the heating tape itself. This thermocouple provides temperature sensing to the associated temperature controller 15 which is normally set to the process operating temperature. Alarm temperature sensing (by means of thermocouple 18) is effected at a temperature acceptable to site conditions, operation of the alarm temperature device providing an alarm signal which locks out the power control system in the over-temperature mode as explained above.

To facilitate maintenance, it is preferable to install the power control system in a safe area where the circuit breaker panels are installed and to run two thermocouple extension leads or thermocouple compensating cables to the start of the heat tracing tape along with the power cables. When the tape is first supplied with power, any surge current is eliminated by utilising the "soft-start" circuitry mentioned above. The latter feature is advantageous not only for eliminating current surges with shorter lengths of tape, but also where power is supplied to a tape which is subjected to sub-zero temperatures and e.g. Ni/Cr conductors may permit a higher current flow than usual.

It will be course be understood that the arrangement described above is purely an example of the invention and that modifications of detail can be made within the scope of the invention as defined in the appended claims.

I claim:

1. An electrical heat tracing tape and an electrical power control system for varying the electrical power supplied to the tape, said heat tracing tape being in a form which can be cut to required lengths and having a series heating element in that the tape comprises at least two lengths of woven or braided resistance wire, each of said lengths being in the form of a flat strip, said flat strips being encased in extruded insulating material whereby they are spaced from one another along the length of the tape, said strips being electrically connectible together at one end of the tape by means of a connector so as to form the series heating element and the tape being provided with a termination for connection to a supply of current via said power control system; said power control system including adjustable power control means which can be adjusted to an estimated electrical power value depending upon the tape length for controlling the amount of power supplied to said tape in order to maintain a preset process temperature, the adjustment of the power control means normally being made when the length of said tape lies within a predetermined range, a current sensor for sensing the current supplied to the tape and for providing a feedback signal to said power control means, said power control means being responsive to the feedback signal to adjust the power supplied to the tape until it is substantially equal to the estimated value, process temperature control means and a process temperature sensor for measuring the temperature at the location of the tape connected to said process temperature control means, said power control means being responsive to said process temperature control means to regulate the power supplied to said tape in accordance with the sensed temperature.

2. A heat tracing tape and a power control system according to claim 1 wherein the power control system includes circuitry to delay adjustment of the amount of power supplied to the tape to the estimated value when the power is first supplied to said tape.

3. A heat tracing tape and a power control system according to claim 1 or 2 wherein the heating elements in said tape are made from wire which is woven or braided in a tubular form which is subsequently flattened.

4. A heat tracing tape and a power control system according to claim 1 in which said insulating material is silicone rubber.

5. A heat tracing tape and a power control system according to claim 1 wherein said tape includes at least one T-branch connection intermediate its ends.

6. A heat tracing tape and a power control system according to claim 1 including an alarm temperature sensor and alarm temperature control means connected to said alarm temperature sensor so as to provide an alarm in the event that the process temperature is approaching, or has reached an upper limit.

7. A heat tracing tape and a power control system according to claim 6 including latch means responsive to an output from said alarm temperature control means so as to discontinue the supply of power to said tape.

* * * * *